United States Patent Office 3,405,169
Patented Oct. 8, 1968

3,405,169
PROCESS FOR THE PREPARATION OF HYDROXY NAPHTHOIC ACIDS
Joseph Levy, Paramus, and William W. Walker, Rutherford, N.J., assignors to Universal Oil Products Company, Des Plaines, Ill., a corporation of Delaware
No Drawing. Filed July 14, 1965, Ser. No. 472,006
12 Claims. (Cl. 260—520)

ABSTRACT OF THE DISCLOSURE

Preparation of hydroxy naphthoic acids by reaction of carbon dioxide with potassium naphtholates under substantially anhydrous conditions in the presence of dibenzyl ether or diphenyl ether.

---

This invention relates to a process for the preparation of hydroxy naphthoic acids and more particularly relates to the preparation of such compounds by carboxylating a potassium naphtholate in the presence of certain inert diluents.

The preparation of phenolic carboxylic acids by the carboxylation of the corresponding alkali metal phenolates involving basically the subjecting of an alkali metal phenolate to the action of carbon dioxide under relatively high pressures and temperatures is the well known reaction generally referred to as the Kolbe-Schmitt synthesis, Ann., 113:125 (1860). While this reaction has also been widely used to prepare hydroxy naphthoic acids from alkali metal naphtholates, it is nevertheless a relatively difficult reaction to effect to obtain a high yield of pure hydroxy naphthoic acid and in particular 2-hydroxy-1-naphthoic acid. One of the major problems involved in carrying out the reaction is due to the fact that the carboxylation must be effected under substantially anhydrous conditions inasmuch as water even in minute quantities will substantially inhibit the carboxylation. This, of course, renders the preparation of an anhydrous naphtholate a critical feature of the reaction. The preparation of anhydrous alkali metal naphtholates is, however, most difficult to readily achieve because alkali metal naphtholates are hydroscopic and moreover highly sensitive to air oxidation. There are also many serious problems involved in effecting the carboxylation itself. For example, the exothermic nature of the reaction makes the reaction difficult to control to prevent the formation of large quantities of side products such as xanthones or tars which in addition to reducing yields make separation and purification of the product difficult and costly.

Various proposals have been made to eliminate these problems and to facilitate the preparation of hydroxy naphthoic acids by utilizing inert diluents or solvents as reaction media for the carboxylation and in some instances for the preparation of the alkali metal naphtholates as well. Included within these solvents or diluents are a wide class of highly divergent materials such as paraffinic hydrocarbons, halogenated aromatics, amines, lower dialkyl ketones, cyclic diethers such as dioxanes, or heterocyclics such as quinolines and pyridines. These suggested diluents and solvents have not, however, been completely successful in eliminating all of the problems inherently involved in effecting the Kolbe-Schmitt synthesis with alkali metal naphtholates, and moreover, most importantly, their use has not resulted in the obtainment of high yields of hydroxy naphthoic acids in a commercially desirable manner. It has now been discovered, however, that the preparation of hydroxy naphthoic acids may be effected according to the Kolbe-Schmitt syntheses to obtain remarkably high yields of product and moreover in a highly commercially desirable manner by utilizing dibenzyl ether or diphenyl ether as inert diluents.

Accordingly, an object of this invention is to provide an improved process for the preparation of hydroxy naphthoic acids. Another object is to provide a process for the preparation of such acids by carboxylating the corresponding potassium naphtholate in the presence of a diluent selected from either diphneyl ether or dibenzyl ether. A still further object is to provide a process for the preparation of such acids using the diluents to facilitate both the formation of the anhydrous potassium naphtholate and the carboxylation thereof whereby a remarkably high yield of product is obtained in a commercially desirable manner. Other objects of this invention will become apparent from the following further detailed description thereof.

The process of this invention is effected, in general, by first preparing an anhydrous mixture of the potassium naphtholate and a diluent selected from either dibenzyl ether or diphenyl ether followed by carboxylation of the naphtholate with carbon dioxide in the presence of the diluent under substantially anhydrous conditions. The potassium salt of hydroxy naphthoic acid formed in the carboxylation is then readily converted to the desired hydroxy naphthoic acid and isolated.

The anhydrous mixture of potassium naphtholate and at least one of the diluents of this invention comprising dibenzyl ether or diphenyl ether is prepared by reacting a naphthol with potassium hydroxide in the presence of the diluent followed by removing the water from the mixture. The naphthols which are used in the reaction comprise either alpha or beta naphthol. Use of the alpha naphthol will result, of course, in the ultimate preparation in the process of 1-hydroxy-2-naphthoic acid and the use of beta naphthol will result in the preparation of 2-hydroxy-1-naphthoic acid.

The naphtholate formation is conveniently effected by mixing together appropriate amounts of the desired naphthol and diluent followed by treating the mixture with an aqueous potassium hydroxide solution. The conditions under which the reaction is effected are not critical. Generally, ordinary temperatures of about 25° C. are satisfactory and stoichiometric ratios of about one mol of potassium hydroxide per mol of naphthol may be utilized. The amount of the diluent used in the process is not critical but the quantity used should at least be sufficient to render the carboxylation product, which normally is a thick viscous slurry, readily stirrable. Generally, a quantity of diluent of about 5 to 10 parts by weight of diluent per part of naphthol is sufficient for this purpose.

While the Kolbe synthesis has been effected with different alkali metal naphtholates, highly successful results are obtained in the present process using the diluents of this invention only with potassium naphtholates. The reason for this is not known. In fact, the reason why the diluents of this invention are so effective in obtaining high yields of pure product is also not known. It is, moreover, most surprising that the diluents of this invention, which do not substantially dissolve the potassium naphtholates are effective at all, inasmuch as it was generally reported that a desirable property of diluents in the Kolbe synthesis is that they be capable of solubilizing the alkali metal naphtholates.

After the mixture of potassium naphtholate and the diluent has been prepared, the water present in the mixture resulting from the salt formation as well as the water contained in the charged potassium hydroxide solution is removed. As previously indicated, it is essential for a successful carboxylation that there be almost no water present in the mixture to retard the reaction. The water may be removed in different ways. For example, the mixture may be treated with a drying agent such as calcium oxide according to conventional techniques. Such methods are not, however, very practical and the preferred and most convenient method of drying is to distill the water from the mixture. Conveniently, such distillation is effected at low pressures of the order of about 15 mm. Hg and at elevated temperatures of about 100° to 150° C. to effectively remove completely all of the water present in the mixture. Alternatively, higher pressures may be utilized of the order of about 70 mm. Hg through use of an entraining agent such as toluene or xylene to remove the last traces of water.

The dried, substantially anhydrous mixture of potassium naphtholate and diluent prepared according to the above preferred procedure involving formation of the naphtholate in the presence of the diluent followed by distillation, or prepared alternatively by other procedures such as for example by mixing the naphtholate already prepared with the diluent followed by drying is then carboxylated with carbon dioxide to form the potassium salt of the hydroxy naphthoic acid. The carboxylation is effected in general according to conventional procedures by charging the anhydrous mixture of the naphtholate and diluent to a suitable apparatus, pressurizing the apparatus with carbon dioxide and then permitting the reaction to proceed to completion at the desired temperature and pressure. In respect to the apparatus utilized, because the use of the diluents of this invention permits the reaction to advantageously proceed at very low pressures, the carboxylation may, if desired, be conveniently effected in the same apparatus used to prepare and dry the mixture of naphtholate and diluent. While various materials such as stainless steel or glass may be suitably used in the apparatus in contact with the reaction mass, it is important that iron not be used inasmuch as this metal tends to increase the formation of tarry side products.

The temperature at which the carboxylation is effected is important and should be maintained within the range of from about 50° to 150° C. and more preferably within the range of about 100° to 130° C. Temperatures above about 150° C. should be avoided especially when carboxylating potassium beta-naphtholate because such high temperatures favor the formation of the potassium salt of 2-hydroxy-3-naphthoic acid instead of the potassium salt of the desired isomer, 2-hydroxy-1-naphthoic acid.

The carbon dioxide pressures used are not critical and may range from about 5 to 500 pounds per square inch above atmospheric pressure or higher, if desired. As previously indicated, however, the diluents of this invention advantageously permit the carboxylation to proceed smoothly and rapidly at very low superatmospheric pressures of the order of about 5 to 50 pounds per square inch and accordingly such low pressures are conveniently utilized. The time required to effect the carboxylation will vary depending upon the carboxylation conditions utilized and the naphtholate being reacted. Generally, however, most carboxylations are completed in about 4 to 6 hours.

The product of the carboxylation comprising the potassium salt of a hydroxy naphthoic acid may be recovered from the carboxylation product mixture and converted to the desired acid in several different ways. One method involves simply extracting the potassium salt with water. Because of the extremely low solubility of the potassium salt of 2-hydroxy-1-naphthoic acid in water, it is necessary that elevated temperatures of the order of about 90° C. be utilized with this salt for the water extraction so as to effectively solubilize the potassium salt and thus permit a ready separation. Conveniently, the separation is effected by charging hot water to the carboxylation product mixture, mixing for a short period and then separating the resulting aqueous layer from the diluent containing-organic layer. The aqueous layer is then acidified with an appropriate acid such as sulfuric acid to precipitate the hydroxy naphthoic acid which is removed from the mixture by filtration, and thereupon dried to recover the desired hydroxy naphthoic acid in high purity and yield.

While the extraction with water is extremely easy and convenient to effect, it is, however, not generally suitable for the preparation of a large quantity of 2-hydroxy-1-naphthoic acid. This is due to the fact that if the water extract of the carboxylation product salt is held for any lengthy period at the elevated extraction temperature made necessary because of the low solubility of the potassium salt, appreciable decarboxylation of the salt occurs. Thus, the time required to extract a large quantity of carboxylation product may be too long to prevent substantial, if not complete, decarboxylation of the potassium salt of 2-hydroxy-1-naphthoic to the potassium naphtholate.

Accordingly, a more suitable treatment for a large scale carboxylation, to separate the potassium salt of 2-hydroxy-1-naphthoic acid from the carboxylation product mixture is to extract the salt with an aqueous sodium hydroxide solution. This extraction may be effected by simply mixing the carboxylation product mixture with an aqueous sodium hydroxide solution at ordinary temperatures of about 25° C. The resulting aqueous layer is then separated from the diluent-containing organic layer and acidified with a suitable acid such as sulfuric acid to form a precipitate. This precipitate usually contains in addition to the desired 2-hydroxy-1-naphthoic acid some unreacted beta-naphthol which is removed by redissolving the precipitate with an aqueous sodium bicarbonate solution mixed with an organic solvent such as toluene. The resulting aqueous layer is separated from the organic layer containing the beta-naphthol and acidified to form the 2-hydroxy-1-naphthoic acid as a precipitate which is separated by filtration. The hydroxy naphthoic acid is then washed with water and dried to recover a high yield of highly pure product.

Because the diluents of this invention are so effective in permitting the carboxylation to take place readily with little or no formation of tarry side products, the diluent remaining in the carboxylation product mixture after the removal of the potassium salt of the hydroxy naphthoic acid according to the above procedures and any unreacted naphthol contained therein may be directly reused in the process without purification. This, of course, adds considerably to the overall desirability of the process of this invention by greatly lowering the cost of preparing hydroxy naphthoic acids.

The process of this invention may be illustrated by the following examples which are not, however, intended to limit the generally broad scope of the present invention in strict accordance therewith:

EXAMPLE I 2-hydroxy-1-naphthoic acid was prepared according to the process of this invention by the following procedure:

About 20 grams of beta-napthol and 200 grams of dibenzyl ether were charged to a reaction flask equipped with a stirrer and a distillation column. The mixture was stirred at about 25° C. until the naphthol had completely dissolved and then about 16 grams of a 45.6 percent aqueous potassium hydroxide solution were added. The mixture containing the resulting potassium naphtholate was then distilled at about 150° to 155° C. and 70 mm. Hg pressure to remove the water. After almost all of the water had been removed the mixture was cooled to about 60° C. and about 65 grams of anhydrous toluene were added followed by redistilling at about 150° to 155° C. and 70 mm. Hg pressure to remove the last traces of water. The resultant anhydrous suspension was then transferred to a Parr pressure reaction apparatus. The potassium naphtholate contained in the mixture was then carboxylated by reaction with carbon dioxide under a pressure of about 5 to 20 pounds per square inch gage. The carboxylation was effected initially at a temperature of about 90° to 100° C. until the absorption of carbon dioxide ceased and then completed in about 4 hours at a temperature of about 120° C. The thick carboxylation product mixture was then stirred with a mixture comprising about 200 grams of a 10 percent aqueous sodium sulfate solution and about 30 grams of a 50 percent aqueous sodium hydroxide solution. The resulting lower aqueous layer was separated from the upper dibenzyl ether-containing organic layer and acidified at about 25° C. to a pH of about 1 to 2 by adding about 18 grams of a 50 percent aqueous sulfuric acid solution. The resulting precipitate was separated by filtration and washed to neutral with water. The washed solids containing a mixture of product and unreacted beta-naphthol were treated with a mixture comprising 21 grams of sodium bicarbonate dissolved in 450 grams of water, and 150 grams of toluene. The resulting aqueous phase was separated from the organic phase and acidified with about 40 grams of a 50 percent sulfuric acid solution. The resulting precipitated 2-hydroxy-1-naphthoic acid was separated by filtration, washed with water and dried to recover about 19.0 grams of product having a melting point of 153° to 155° C. and constituting a yield of 71.5 percent.

EXAMPLE II 1-hydroxy-2-naphthoic acid was prepared according to the general procedure of Example I with dibenzyl ether as diluent but using alpha-naphthol as starting material. The carboxylation was effected under a carbon dioxide pressure of about 5 to 20 pounds per square inch and was continued for about four hours at a temperature of about 120° C. The product having a melting point of 187° to 189° C. was obtained in a yield of 69.7 percent.

EXAMPLE III 2-hydroxy-1-naphthoic acid was prepared according to the general procedure of Example I but using diphenyl ether instead of dibenzyl ether as diluent. The carboxylation was effected under a carbon dioxide pressure of about 5 to 20 pounds per square inch gage and was continued for about 4 hours at 120° C. The product was obtained in a yield of about 70.5 percent.

EXAMPLE IV 2-hydroxy-1-naphthoic acid was prepared according to the general procedure of Example I. The carboxylation was effected under a carbon dioxide pressure of about 5 to 30 pounds per square inch gage for about 5 hours at 120° C. The recovery of product from the carboxylation product mixture was not, however, according to the procedure of Example I. Instead the carboxylation product mixture was mixed with water at 90° C. and the resulting aqueous layer was separated from the dibenzyl ether containing organic layer, washed with toluene and acidified with sulfuric acid. The precipitated product was separated from the mixture by filtration, washed with water and dried to recover the product having a melting point of 159° to 161° C. in a yield of 77.5 percent.

EXAMPLE V

This example is cited to demonstrate the unusual ability of the diluents of this invention to facilitate the preparation of hydroxy naphthoic acids without the usual formation of substantial quantities of tarry side products which permits the ready reuse of the diluents without purification.

2-hydroxy-1-naphthoic acid was prepared according to the general procedure of Example I. The dibenzyl ether diluent used, however, was obtained from a previous carboxylation and comprised the unpurified carboxylation product mixture remaining after the potassium salt of the 2-hydroxy-1-naphthoic acid had been extracted with water. The carboxylation was effected under a carbon dioxide pressure of 5 to 30 pounds per square inch gage at a temperature of about 120° C. for about 5 hours. The product was recovered from the carboxylation product mixture by water extraction followed by acidification to obtain the 2-hydroxy-1-naphthoic acid product having a melting point of 159° to 161° C. in a yield of 77.5 percent.

We claim as our invention:

1. A process for preparing a hydroxy naphthoic acid which comprises reacting carbon dioxide with a potassium naphtholate under substantially anhydrous conditions at superatmospheric pressures in the presence of a diluent selected from the group consisting of dibenzyl ether and diphenyl ether, and thereafter recovering the desired product.

2. A process for preparing a hydroxy naphthoic acid which comprises reacting carbon dioxide with a potassium naphtholate under substantially anhydrous conditions at superatmospheric pressures and at a temperature of from about 50° to 150° C. in the presence of a diluent selected from the group consisting of dibenzyl ether and diphenyl ether, and thereafter recovering the desired product.

3. A process for preparing a hydroxy naphthoic acid which comprises reacting carbon dioxide with a potassium naphtholate under substantially anhydrous conditions at superatmospheric pressures and at a temperature of from about 50° to 150° C. in the presence of dibenzyl ether, and thereafter recovering the desired product.

4. A process for preparing a hydroxy naphthoic acid which comprises reacting carbon dioxide with a potassium naphtholate under substantially anhydrous conditions at superatmospheric pressures and at a temperature of from about 50° to 150° C. in the presence of diphenyl ether, and thereafter recovering the desired product.

5. A process for preparing 2-hydroxy-1-naphthoic acid which comprises reacting carbon dioxide with potassium beta naphtholate under substantially anhydrous conditions at a temperature of from about 50° C. to 150° C. and at a pressure above atmospheric of about 5 to 50 pounds per square inch in the presence of a diluent selected from the group consisting of dibenzyl ether and diphenyl ether, and thereafter recovering the desired product.

6. A process for preparing 1-hydroxy-2-naphthoic acid which comprises reacting carbon dioxide with potassium alpha naphtholate under substantially anhydrous conditions at a temperature of from about 50° C. to 150° C. and at a pressure above atmospheric of about 5 to 50 pounds per square inch in the presence of a diluent selected from the group consisting of dibenzyl ether and diphenyl ether, and thereafter recovering the desired product.

7. A process for preparing a hydroxy naphthoic acid which comprises: (A) reacting a naphthol with potassium hydroxide in the presence of a diluent selected from the group consisting of dibenzyl ether and diphenyl ether; (B) removing the water present in the resulting mixture of potassium naphtholate and diluent; (C) reacting the potassium naphtholate contained in the diluent with carbon dioxide under substantially anhydrous conditions at superatmospheric pressures and; (D) thereafter recovering the desired product.

8. A process for preparing a hydroxy naphthoic acid which comprises: (A) reacting a naphthol with potassium hydroxide in the presence of a diluent selected from the group consisting of dibenzyl ether and diphenyl ether; (B) removing the water present in the resulting mixture of potassium naphtholate and diluent by distillation; (C) reacting the potassium naphtholate contained in the diluent with carbon dioxide under substantially anhydrous conditions at superatmospheric pressures and at a temperature of from about 50° to 150° C.; and (D) thereafter recovering the desired product.

9. A process for preparing a hydroxy naphthoic acid which comprises: (A) reacting a naphthol with potassium hydroxide in the presence of dibenzyl ether; (B) removing the water present in the resulting mixture of potassium naphtholate and dibenzyl ether by distillation; (C)

reacting the potassium naphtholate contained in the dibenzyl ether with carbon dioxide under substantially anhydrous conditions at superatmospheric pressures and at a temperature of from about 50° to 150° C.; and (D) thereafter recovering the desired product.

10. A process for preparing a hydroxy naphthoic acid which comprises: (A) reacting a naphthol with potassium hydroxide in the presence of diphenyl ether; (B) removing the water present in the resulting mixture of potassium naphtholate and diphenyl ether by distillation; (C) reacting the potassium naphtholate contained in the diphenyl ether with carbon dioxide under substantially anhydrous conditions at superatmospheric pressures and at a temperature of from about 50° to 150° C.; and (D) thereafter recovering the desired product.

11. A process for preparing 2-hydroxy-1-naphthoic acid which comprises: (A) reacting beta-naphthol with potassium hydroxide in the presence of a diluent selected from the group consisting of dibenzyl ether and diphenyl ether; (B) removing the water present in the resulting mixture of potassium beta-naphtholate and diluent by distillation; (C) reacting the potassium beta-naphtholate contained in the diluent with carbon dioxide under substantially anhydrous conditions at a temperature of from about 50° to 150° C. and at a pressure above atmospheric of about 5 to 50 pounds per square inch; and (D) thereafter recovering the desired product.

12. A process for preparing 1-hydroxy-2-naphthoic acid which comprises: (A) reacting alpha naphthol with potassium hydroxide in the presence of a diluent selected from the group consisting of dibenzyl ether and diphenyl ether; (B) removing the water present in the resulting mixture of potassium alpha naphtholate and diluent by distillation; (C) reacting the potassium alpha naphtholate contained in the diluent with carbon dioxide under substantially anhydrous conditions at a temperature of from about 50° to 150° C. and at a pressure above atmospheric of about 5 to 50 pounds per square inch; and (D) thereafter recovering the desired product.

References Cited

UNITED STATES PATENTS 2,807,643  10/1957  Hartley et al. _____ 260—521

LORRAINE A. WEINBERGER, *Primary Examiner.*

D. E. STENZEL, *Assistant Examiner.*